United States Patent
Masahiro

[11] Patent Number: 6,055,440
[45] Date of Patent: Apr. 25, 2000

[54] PORTABLE TERMINAL DEVICE

[75] Inventor: Matai Masahiro, Shizuoka, Japan

[73] Assignee: NEC Corporation, Tokyo, Japan

[21] Appl. No.: 08/933,033

[22] Filed: Sep. 18, 1997

[30] Foreign Application Priority Data

Sep. 19, 1996 [JP] Japan .................................. 8-248216

[51] Int. Cl.⁷ .................................................. H04B 1/10
[52] U.S. Cl. ........................ 455/556; 455/566; 455/254; 455/310; 455/38.3
[58] Field of Search ............................... 455/38.1, 38.4, 455/31.2, 566, 556, 344, 66, 254, 226.1, 296, 310, 63, 552, 553, 343, 38.2, 38.3, 557, 565; 340/825.44, 34.1

[56] References Cited

U.S. PATENT DOCUMENTS

| | | | |
|---|---|---|---|
| 5,148,473 | 9/1992 | Freeland et al. | 455/556 |
| 5,437,060 | 7/1995 | Delamater et al. | 455/310 |
| 5,502,437 | 3/1996 | Marko et al. | |
| 5,630,224 | 5/1997 | Swail | 455/296 |
| 5,765,113 | 6/1998 | Russo et al. | 455/296 |
| 5,793,303 | 8/1998 | Koga | 455/38.4 |

FOREIGN PATENT DOCUMENTS

| | | |
|---|---|---|
| 3-64133 | 3/1991 | Japan . |
| 6-45986 | 2/1994 | Japan . |
| 7-99680 | 4/1995 | Japan . |
| 7-203510 | 8/1995 | Japan . |
| 7-212837 | 8/1995 | Japan . |
| 8-19018 | 1/1996 | Japan . |
| 9-327075 | 12/1997 | Japan . |

*Primary Examiner*—Reinhard J. Eisenzopf
*Assistant Examiner*—Lester G. Kincaid
*Attorney, Agent, or Firm*—Young & Thompson

[57] ABSTRACT

Disclosed is a portable terminal device that, by changing the operation of a portable terminal unit based on a selective-calling reception operation, can acquire preferable pager reception sensitivity. A portable terminal device comprises: selective-calling reception means with a selective-calling reception function for determining whether an operation is a selective-calling reception operation; portable terminal mean with a portable radio telephone function to enable transmission and reception for determining whether a key has been input; and display means for, when the input of the key is detected during the operation of the portable radio telephone function, displaying the result of the detection.

12 Claims, 4 Drawing Sheets

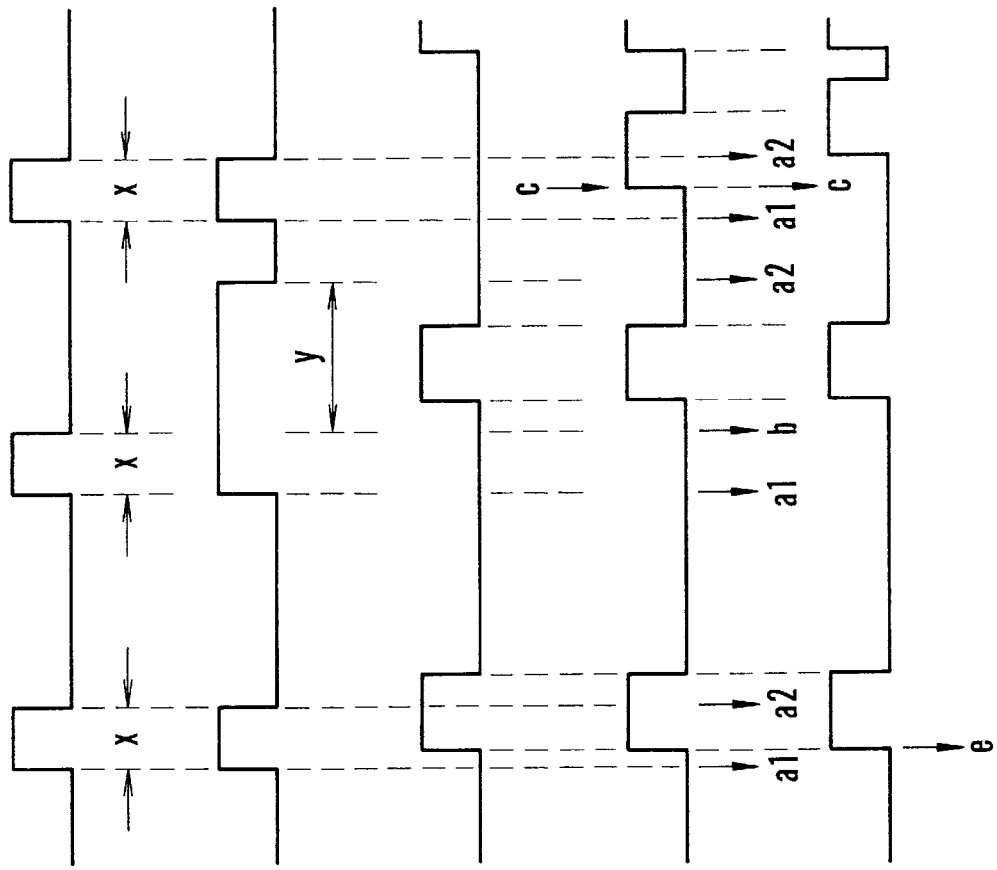

PORTABLE TERMINAL DEVICE

BACKGROUND OF THE INVENTION

1. Field of the Invention

The present invention relates to a portable terminal device having a selective-calling reception (pager) function, and a method for processing a signal received by the portable terminal device, and in particular to improvement in portable terminal operation at a time of reception of a selective-calling message.

2. Description of the Prior Art

Conventionally, a portable terminal device that incorporates a selective-calling receiver is disclosed in, for example, Japanese Unexamined Patent Publication No. Hei 3-64133, and a portable terminal device wherein a selective-calling reception circuit is located in a battery unit is disclosed in Japanese Unexamined Patent Publication No. Hei 6-45986. These portable terminal devices are so designed that a pager radio unit and a pager controller for selective-calling reception, and a portable terminal radio unit and a portable terminal controller for portable radio-telephone terminal transmission and reception are arranged in parallel in the same case. These components independently perform a selective-calling reception function and a transmission/reception function via a portable terminal.

FIG. 1 is a block diagram illustrating such a conventional portable terminal device.

In FIG. 1, a pager radio unit 102 amplifies and demodulates a signal that is received by a pager side antenna 101, converts (decodes) the resultant signal into a digital signal, and outputs it. A pager controller 103 processes the digital signal and performs various control processes. A portable terminal radio unit 202 amplifies and demodulates a signal received by an antenna 201 at a portable terminal side, converts the resultant signal into a digital signal, and outputs it. A portable terminal controller 203 processes a digital signal and performs various control processes. A fast clock generator 204 is commonly used by a pager and a portable terminal device. A communication unit 205 is provided for a portable terminal. A display unit 301 and a key 302 are also provided for a portable terminal device. The pager side antenna 101, the pager radio unit 102 and the pager controller 103 constitute a selective-calling reception unit, and the antenna 201, the portable terminal radio unit 202 and the portable terminal controller 203 constitute a portable terminal unit.

In the selective-calling reception unit of the portable terminal device, the pager radio unit 102 is controlled by a radio unit power source 103a in the pager a controller 103. A digital demodulated signal output by the pager radio unit 102 is synchronized with a reception signal by a pager side synchronizer 103b. A pager ID comparator 103c determines whether or not an ID is included in the reception signal. When the ID is included, the control exercised by the pager radio unit power source 103a is continued, a message that follows the ID is analyzed by a message processor 103d, and the result of the analysis is stored in an information storage unit 103e. When a notification unit 103g is activated by the manipulation of the key 302, a message is obtained from the information storage unit 103e and is displayed on the display unit 301. The processing performed by the selective-calling reception unit is timed by the fast clock generator 204 that is supplied by the portable terminal controller 203.

In the portable terminal unit, the portable terminal radio unit 202 is controlled by a radio unit power source 203a, part of the portable terminal controller 203, and a digital demodulated signal output by the portable terminal radio unit 202 is synchronized with a reception signal by a synchronizer 203b. An ID comparator 203c determines whether or not an ID (differing from that for a pager side) is included in the reception signal. When the ID is included, the control exercised by the radio unit power source 203a is continued, communication data that follows the ID is analyzed by a data processor 203d, display data is stored in the information storage unit 103e, and communication data is converted into analog data by a voice processor 203e and the analog data is output to the communication unit 205. The notification unit 103g on the pager side and the data processor 203d are controlled by a timing controller 203h in consonance with the manipulation of the key 302. Generally, the fast clock generator 204 on the portable terminal side is fast so that it can handle voice data. The communication unit 205 supplies a voice issued by a user of the portable terminal device as a communication data to the voice processor 203e after coding.

Since the conventional portable terminal device as above structured is so designed that the pager side, i.e., the selective-calling receiver, and the portable terminal unit are independently provided and operated, fast processing is performed to employ key input for communication, without any consideration being given to the reception operation performed by the selective-calling receiver. As a result, noise is produced during fast processing and reception by the pager is difficult. In general, the selective-calling receiver employs a low frequency and tends to be adversely affected by the noise.

SUMMARY OF THE INVENTION

To resolve the above shortcoming, it is one object of the present invention to provide a portable terminal device that, by changing the operation of a portable terminal unit based on a selective-calling reception operation, can acquire preferable pager reception sensitivity.

To achieve the above object, according to the present invention, the portable terminal device comprises a

- selective-calling receiver which functions to determine whether an operation is a selective-calling reception operation;
- a portable terminal having a portable radio telephone function to enable transmission and reception, and for determining whether key input has been performed; and
- a display for displaying the result of key input during the operation of the portable radio telephone function.

Further in the portable terminal device according to the present invention, a timer is provided for the selective-calling receiver to generate a slow clock for pager control, and the portable terminal identifies a type of pager signal received during a specific period of time measured by the timer, and a result of the identification is displayed on the display.

In addition, in the portable terminal device according to the present invention, the portable terminal performs a corresponding process immediately after key input or after a delay continuing for a specific period of time, and a result of the process is displayed on the display; or the portable terminal means does not perform the corresponding process for the key input, and a message to the effect that the process has not been performed is displayed on the display.

Furthermore, in the portable terminal device according to the present invention, the type of the pager reception signal that is identified by the portable terminal is employed as an identification symbol for the portable terminal device.

Moreover, in the portable terminal device according to the present invention, when the corresponding process for key input is not performed, a message to the effect that a selective-calling message is being received is displayed on the display.

BRIEF DESCRIPTION OF THE DRAWINGS

FIGS. 4A through 4E are timing charts for signals in the given sections shown in the block diagram in FIG. 2.

DETAILED DESCRIPTION OF THE PREFERRED EMBODIMENT

The preferred embodiment of the present invention will now be described.

Figure 1:
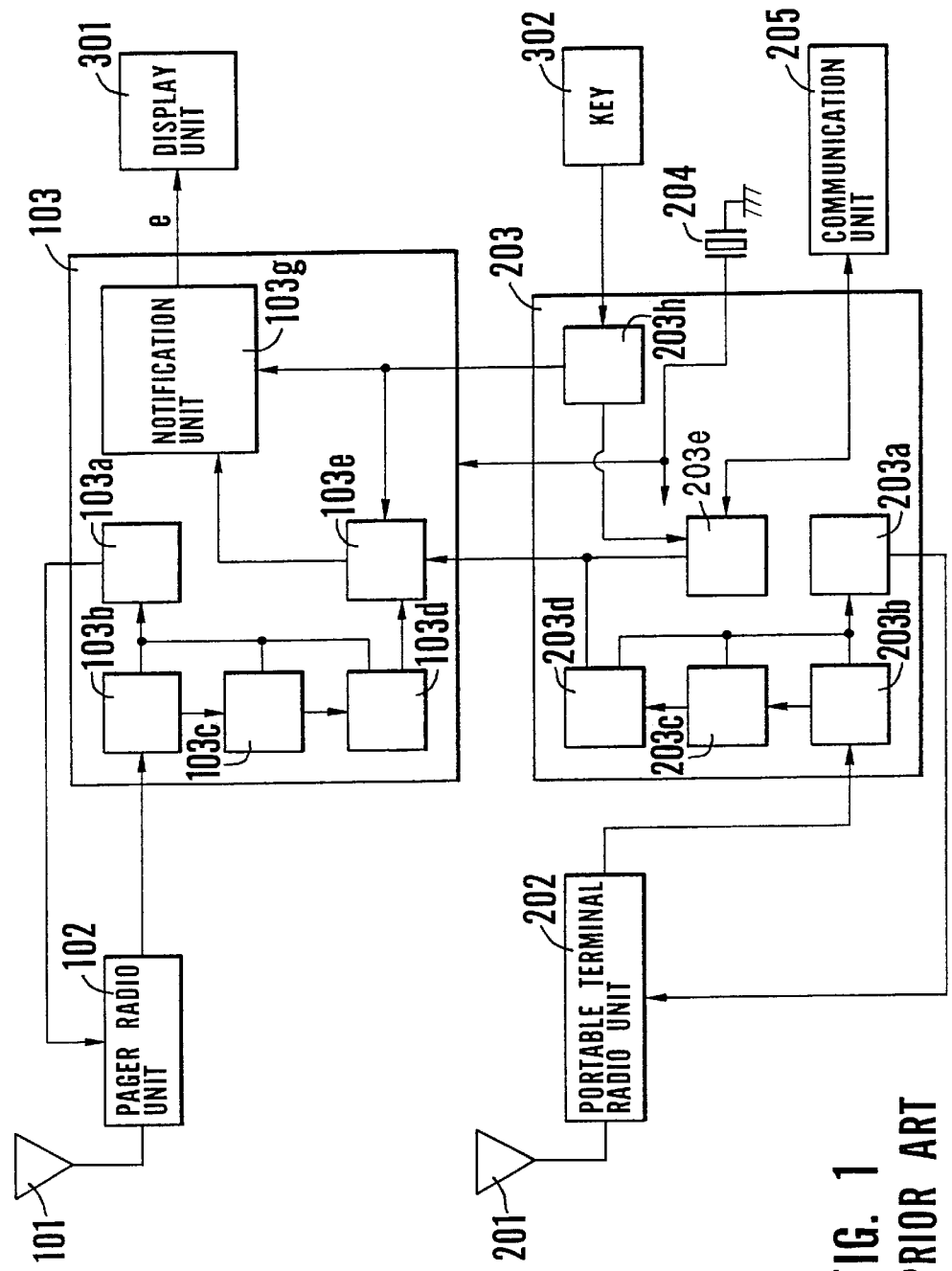
FIG. 1 is a block diagram illustrating a conventional portable terminal device as an example.
Figure 2:
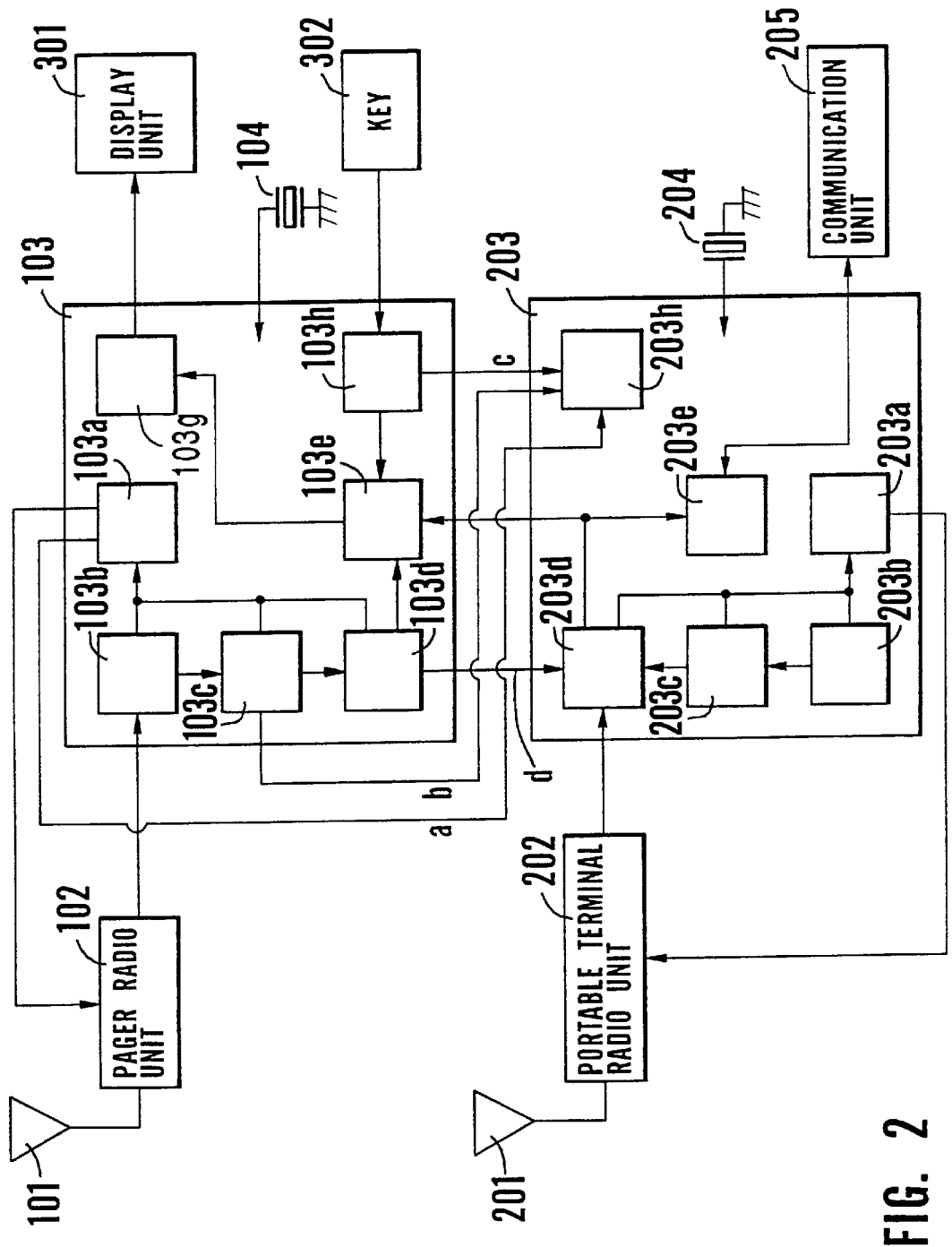
FIG. 2 is a block diagram illustrating a preferable portable terminal device according to an embodiment of the present invention.

FIG. 2 is a block diagram illustrating a portable terminal device according to an embodiment of the present invention.

In FIG. 2, a pager radio unit 102 amplifies and demodulates a signal having a frequency band of for example 280 MHz that is received at a pager side antenna 101, and converts (decodes) the resultant signal into a digital signal and outputs it. A pager controller 103 performs processing for the digital signal, and controls various other processes. A slow clock generator 104 generates a slow clock whose frequency is for example between 32 KHz and 100 KHz to perform a reception signal process and a notification process on the pager side. A portable terminal radio unit 202 amplifies and demodulates a signal having a frequency of for example 1.9 GHz received at an antenna 201 on the portable terminal side, and converts the resultant signal into a digital signal and outputs it. A portable terminal controller 203 performs processing for the digital signal and controls various processes. A fast clock generator 204 generates a fast clock whose frequency is for example between 16 MHz and 20 MHz to perform a reception signal process and a communication process on the portable terminal side. A display section 301 and a key 302 are provided for a portable terminal device. The pager side antenna 101, the pager radio unit 102 and the pager controller 103 constitute a selective-calling reception unit, and the antenna 201, the portable terminal radio unit 202 and the portable terminal controller 203 constitute a portable terminal unit.

The pager controller 103 of the selective-calling reception unit in the portable terminal device includes a pager radio unit power source 103a, for controlling the power for the pager radio unit 102 and a timing controller 103h; a pager side synchronizer 103b, for synchronizing with a reception signal a digital demodulated signal that is output by the pager radio unit 102; a pager ID comparator 103c for determining whether or not an ID is included in a reception signal; a message processor 103d, for analyzing a message that follows the ID; an information storage unit 103e, for storing the analyzed message; a controller 103h; and a notification unit 103g.

The portable terminal controller 203 of the portable terminal unit includes a radio unit power source 203a, for controlling power for the portable terminal radio unit 202; a synchronizer 203b, for synchronizing with a reception signal a digital demodulated signal that is output by the portable terminal radio unit 202; an ID comparator 203c, for determining whether or not an ID (differing from an ID on the pager side) is included in the reception signal; a data processor 203d, for analyzing communication data that follows the ID; a voice processor 203e for processing communication data, etc,; and a timing controller 203h for determining timing conditions for a key input signal and a reception condition signal that is sent from the pager controller 103, and for changing a processing mode. A communication unit 205 outputs the communication data as voice after analog-processing which is once stored in the information storage unit 103e and supplies a voice issued by a user of the portable terminal device as a communication data to the voice processor 203e after coding.

In this embodiment, the display unit 301 and the key 302 are provided for the pager controller; however, the slow clock 104 for pager control may be transmitted as needed to the portable terminal controller 203 to enable the portable terminal side to control the display unit 301 and the key 302. The pager controller 103 stores a pager identification signal (hereinafter referred to as an ID), and includes measurement means for measuring reception timing. An ID for the portable terminal is stored in the portable terminal controller 203.

The processing will now be described.

First, a pager signal received via the pager side antenna 101 is demodulated by the pager radio unit 102, and the demodulated signal is converted into a digital signal. Thereafter, the pager controller 103 permits power to be supplied to the pager radio unit 102 and acquires the received digital signal only when the received data is intended for the pager radio unit 102. The timing for the operation of the pager controller 103 is provided by the slow clock generator 104, and the pager controller 103 has a timer function for counting the slow clock 104. When the pager ID comparator 103c determines that there is an ID in the received pager signal that matches an ID set in advance for the pager controller 103, the pager controller 103 continues to supply power to the pager radio unit 102 to acquire the following message data.

Although the location at which an ID may be detected can be defined by a system or can be estimated from the number of users, a long period of time is required for message data, and estimating the time required is not possible. Therefore, when an ID is not properly identified, it is assumed that the data which follows is a message for a third party, and the pager controller 103 halts the supply of power to the pager radio unit 102. In this embodiment, a radio unit power supply signal a and an ID verification signal b are transmitted by the pager controller 103 to the portable terminal controller 203. In order to link data that are received to the portable terminal, a data signal d in the pager reception signal is also transmitted to the portable terminal controller 203.

A portable terminal signal is received at the antenna 201 and is demodulated by the portable terminal radio unit 202, and the demodulated signal is converted into a digital signal. Thereafter, the portable terminal controller 203 permits power to be supplied to the portable terminal radio unit 202 and acquires the received digital signal only when the received data is intended for the portable terminal controller 203. The timing for the operation of the portable terminal controller 203 is provided by the fast clock generator 204, and the portable terminal controller 203 has a timer function for counting the fast clock 204. The fast clock is required since a reception signal processed by the portable terminal is generally more complicated than the data processed by the pager. When the ID comparator 203c determines that there is an ID in the received pager signal that matches an ID set in advance for the portable terminal controller 203, a communication line is established.

Since the processing for establishment of the line from the portable terminal by manipulating the key 302 is also more complicated than the data processing performed by the pager side, a fast clock is required. When the fast clock operation by the portable terminal and the reception operation of the pager are to be performed at the same time, as previously mentioned, reception by the pager can not be performed because of the fast clock. In other words, since the fast clock operation in the portable terminal is performed in accordance with a specific cycle, if the radio unit power supply signal a for the pager can be detected by the portable terminal, either a pager signal is re-transmitted or reception in the portable terminal side is temporarily halted to ensure the reliability of the received pager data.

Since key manipulation occurs at random and is not established for the system, a complicated process is required to issue a pager signal re-transmission request or a portable terminal signal re-transmission request due to a temporary halt in reception at the portable terminal.

According to the present invention, the following process is performed when the key is manipulated. This processing will now be described while referring to the flowchart in FIG. 3 and the timing charts in FIGS. 4A through 4E.

Figure 3:
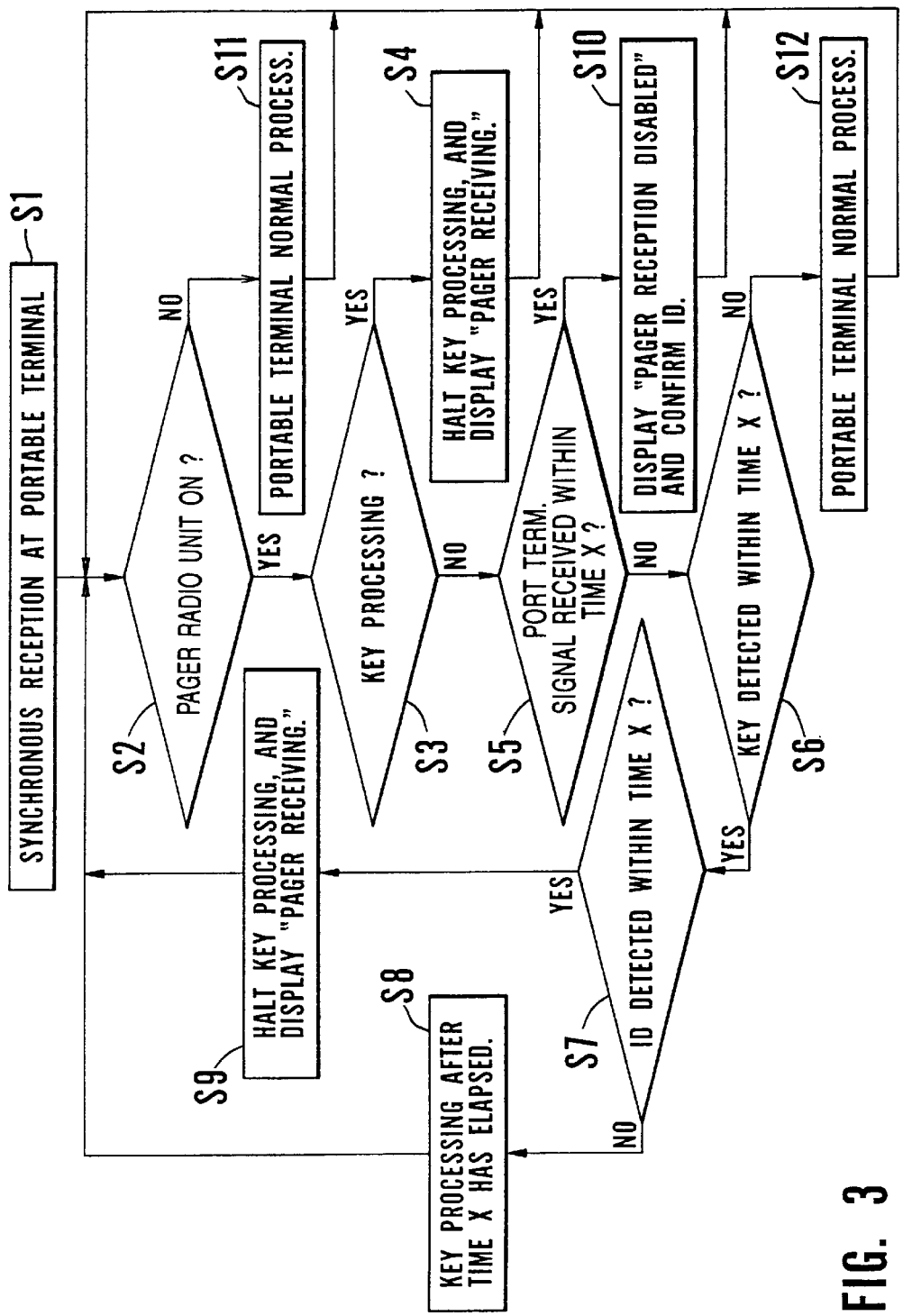
FIG. 3 is a flowchart showing processing performed by the portable terminal device according to the present invention.

First, in FIG. 3, when the operation of the pager radio unit 102 is detected (step S2) while the portable terminal is synchronously receiving a signal (step S1), a check is performed to determine whether or not key processing is being performed on key input (step S3). If key processing is being performed, it is halted, and a display output e indicating that the reception is in progress is displayed on the display unit 301 (step S4). When it is determined that key input processing is not being performed, a check is performed on whether or not a signal is being received at the portable terminal in a period of time X (generally, X is short) (step S5). If there is no data reception, key input c, within the period of time X, is monitored (step S6). If there is key input c, the input is held. Further, a check is performed to determine whether or not ID data b has been identified within the period of time X (step S7). If the ID data b has not been identified, after the period of time X has elapsed, key input processing is performed (step S8).

If the ID data b is identified within the period of time X, it is assumed that the reception of a pager message is to be continued for a long time, and key input is determined to be invalid and a display output e to the effect that the pager is receiving data is displayed on the display unit 301 (step S9). When, at step S5, it is ascertained that a signal has been received at the portable terminal during the period of time X, display output e indicating non-reception of data by the pager is displayed on the display unit 301, and the portable terminal asks at this time whether or not an ID symbol for the portable terminal is included in pager data (step S10). Although the processing differs in accordance with the error condition of the data received by the pager, the processing performed in the present invention is for random key input, and is performed as is shown in FIG. 3. When at step S2 the power-ON state of the radio unit 102 is not detected, or when at step S6 key input is not detected, normal processing is performed (steps S11 and S12).

In FIGS. 4A to 4E are shown process timings when a radio unit power supply signal a and a key input c are detected by the routine shown in the flowchart in FIG. 3. In FIG. 4A is shown a pager radio unit operation signal emitted by the pager when its ID is not present, and the operation signal is operated for period of time X at a constant cycle so that the synchronization and the ID of the pager can be detected. When the pager ID is included in the received signal, as is shown in FIG. 4B, upon the receipt of the pager ID, the pager radio operation signal is operated for another period of time y (y is a variable) employed for recognizing a following message. A radio unit operation signal (fast clock operation signal) for the portable terminal is operated independently of the pager, as is shown in FIG. 4C, at a constant cycle as well as for the operation of the pager. When key manipulation occurs at the portable terminal, the radio unit operation mode is changed to permit communication, so that communication using the fast clock is possible. Since this operation is performed separately from the reception by the pager, reception by the pager will be difficult due to the noise produced by the fast process clock. In this invention, as is shown in FIG. 4E, after key input is temporarily halted and a2 is detected, processing for the manipulated key is performed, so that the fast processing is not performed at the same time as is the reception by the pager. When the period of time within which the pager is operated is extended to receive a message, and when the reception operation for the portable terminal begins during this time, "Pager reception" is displayed on the display unit 301 to notify the operator.

As is described above, according to the present invention, a portable terminal device comprises: selective-calling reception means with a selective-calling reception function for identifying a selective-calling reception operation; portable terminal means with a portable radio telephone function for enabling transmission and reception, and for determining whether key input has been performed; and display means for displaying the result of key input when the key input is made during operation of the portable radio telephone function. As a result, key processing based on the key input can be halted, and a display to indicate pager reception in progress can be provided to prevent the fast clock operation of the portable terminal means and the pager reception operation from occurring at the same time, so that desirable pager reception sensitivity can be obtained.

Further, in the portable terminal device according to the present invention, a timer is provided for the selective-calling reception means to generate a slow clock for pager control, and the portable terminal means determines which type of a pager signal is received during a specific period of time measured by the timer, and the display means displays the result of the determination. As a result, it is possible to determine whether the selective-calling reception is currently being performed or whether a transmission/reception operation at the portable terminal is currently being performed.

In addition, in the portable terminal device according to the present invention, the portable terminal means performs a corresponding process immediately after the key input or after a delay, continuing for a specific period of time, and either the display means displays the result obtained by the process, or the portable terminal means does not perform a corresponding process for the key input, and the display means displays a message to the effect that the process was not performed. Therefore, in consonance with the timing corresponding to the type of a signal received by the pager, pager reception can be inhibited, key processing can be permitted, or normal processing at the portable terminal can be performed.

Furthermore, in the portable terminal device according to the present invention, the type of pager reception signal that is identified by the portable terminal means is employed as an identification symbol for the portable terminal device. Therefore, when an identification symbol is detected that can be easily received by the pager within a specific period of time, key processing is performed for a predetermined period of time. This operation can be easily provided without the provision of an additional circuit.

Moreover, in the portable terminal device according to the present invention, when the corresponding process for key input is not performed, the display means displays a message to the effect that a selective-calling message is being received. As a result, reception characteristics for selective-calling reception and portable terminal reception can be improved.

What is claimed is:

1. A portable terminal device comprising:

a selective-calling reception pager unit with a pager clock generator adapted to perform pager signal reception;

a portable terminal radio unit with a radio clock generator adapted to perform radio signal reception, said radio clock generator providing a radio clock signal with a frequency greater than a pager clock signal provided by said pager clock generator; and a portable terminal controller adapted to inhibit operation of said portable terminal radio unit and noise from said radio clock signal during message reception by said selective-calling reception pager unit.

2. The portable terminal device of claim 1, wherein said portable terminal controller is further adapted to inhibit operation of said selective-calling reception pager unit during message identification confirmation.

3. The portable terminal device of claim 2, further comprising a key input and a display, said key input activating said portable terminal radio unit and said display being adapted to indicate that reception by said selective-calling reception pager unit is disabled while the message identification is being confirmed.

4. The portable terminal device of claim 3, wherein said portable terminal controller is further adapted to inhibit said key input during message reception by said selective-calling reception pager unit.

5. The portable terminal device of claim 3, further comprising a first timer associated with said pager clock generator, wherein said portable terminal controller identifies message reception by said selective-calling reception pager unit during a specific period of time measured by said first timer, and wherein a result of the identification is displayed on said display.

6. The portable terminal device of claim 5, wherein said key input is adapted to accept and hold input during the specific period of time and said portable terminal controller is adapted to, after the specific period of time has elapsed, i) process the key input if no message reception by said selective-calling reception pager unit during the specific period of time has been detected and, ii) inhibit key processing if message reception by said selective-calling reception pager unit during the specific period of time has been detected, said display being adapted to display a message corresponding to pager message reception when message reception is detected.

7. The portable terminal device of claim 6 wherein said portable terminal controller further comprises means for detecting a type of pager signal received during the specific period of time and the type of pager signal received is employed as an identification symbol for said portable terminal device.

8. The portable terminal device of claim 6, wherein upon inhibiting of the key processing upon message reception by said selective-calling reception pager unit during the specific period of time has been detected, said display is adapted to display a message indicating that key processing is inhibited.

9. The portable terminal device of claim 3, wherein said radio clock generator and said key input are selectively disabled by said portable terminal controller whenever said selective-calling reception pager unit is receiving a message to obtain improved pager reception sensitivity by inhibiting noise generated by said radio clock generator and key input processing.

10. The portable terminal device of claim 9, wherein said display displays a message indicating that key input processing has been halted while a message is being received by said selective-calling reception pager unit.

11. A method for processing a signal received by a portable terminal device having both a selective-calling reception pager and a radio-telephone transceiver section, said method comprising the steps of:

at a first clock rate, detecting whether a selective-call reception pager is currently receiving a pager message;

at a second clock rate faster than the first clock rate and independent of the first clock rate, detecting whether a radio-telephone transceiver section is currently receiving a radio-telephone message;

suspending processing of key input and operation of a fast clock associated with the second clock rate in the radio-telephone transceiver section while the selective-call reception pager is detected to be currently receiving a pager message; and displaying a message that pager message reception is in progress when key input is attempted while the selective-call reception pager is detected to be receiving a pager message.

12. The method of claim 11 comprising the further steps of:

inhibiting operation of the selective-call reception pager during message reception by the radio-telephone transceiver section; and displaying a message that pager reception is disabled.

* * * * *

UNITED STATES PATENT AND TRADEMARK OFFICE
CERTIFICATE OF CORRECTION

PATENT NO.    : 6,055,440
DATED         : April 25, 2000
INVENTOR(S)   : Masahiro Matai It is certified that error appears in the above-identified patent and that said Letters Patent is hereby corrected as shown below:

<u>Title Page,</u>
Item [19], change "Masahiro" to --Matai--.
Rewrite Item [75] as follows: --[75] Inventor: Masahiro Matai, Shizuoka, Japan--.

Signed and Sealed this

Third Day of July, 2001

*Attest:*

Nicholas P. Godici

*Attesting Officer*

NICHOLAS P. GODICI
*Acting Director of the United States Patent and Trademark Office*